Dec. 18, 1956 J. A. REED 2,774,654
CONTACT MIXER
Filed Feb. 26, 1952
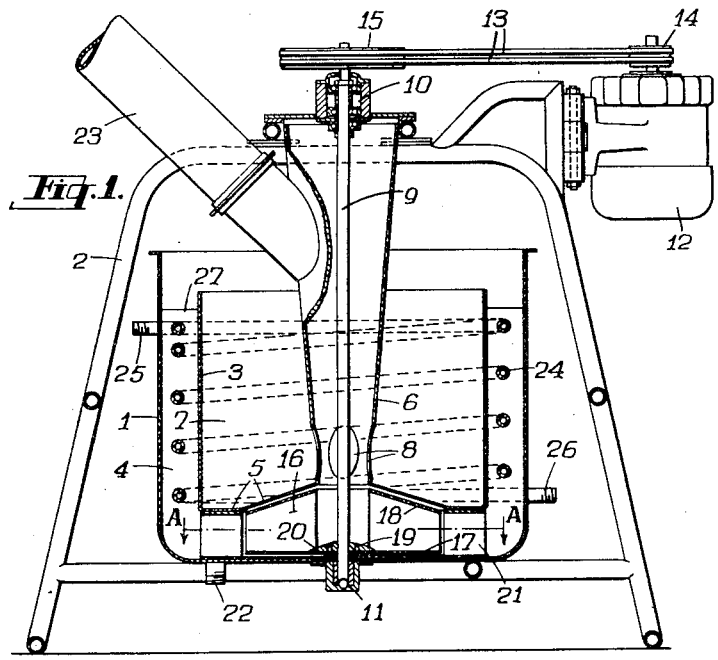
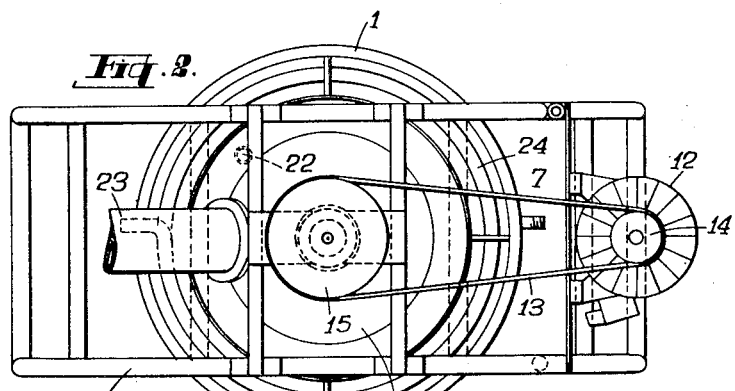
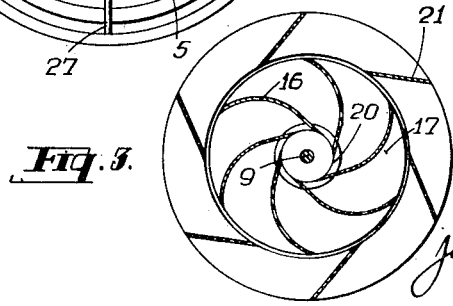
John A. Reed
Inventor
by Mason, Porter, Diller & Stewart
Attorneys

United States Patent Office 2,774,654
Patented Dec. 18, 1956

2,774,654
CONTACT MIXER

John Alva Reed, Glossop, England, assignor, by mesne assignments, to Tootal Broadhurst Lee Company Limited, Manchester, England, a British company Application February 26, 1952, Serial No. 273,440

Claims priority, application Great Britain March 1, 1951

6 Claims. (Cl. 23—285)

The present invention relates to the treatment of one substance with another, of which at least one is a liquid, and includes the treatment of a solid with a liquid, for example to wash the solid with the liquid and includes the mixing of a liquid with a solid or a liquid by which is meant either the dissolving of a solid in a liquid or the production of a chemical reaction between the substances or the production of a mixture of the substances.

In the following specification and claims the word liquid is intended to mean either a single liquid or two or more liquids.

According to the present invention the liquid is contained with the other substance and is caused to flow in a closed circuit in which it is centrifuged and then caused to ascend in a more or less annular stream whereupon it is allowed to flow inwardly and downwardly in a second and more or less annular stream and then to flow inwardly and downwardly again whereupon it is re-centrifuged.

If desired the liquid may be subjected to interchange of heat in order to heat or cool the same during its flow through said closed circuit and preferably during its ascent in said first mentioned annular stream.

Preferably the liquid is caused to flow in a turbulent manner through part of said closed circuit and especially during its ascent in said more or less annular stream where it may be heated or cooled. Such turbulent flow may be achieved by suitably adjusting the rate of centrifuging of the liquid.

The liquid, whilst moving towards that portion of its path of travel where it ascends in said more or less annular stream may be restrained against undue rotational movement as a result of the centrifuging thereof and it may also be restrained against undue rotational movement whilst ascending in said annular stream.

The liquid may be sieved or filtered during its path of travel in order to restrain movement of solid matter with the liquid. For example it may be sieved immediately after it has been centrifuged.

An apparatus according to the present invention consists of a centrifugal impeller located at or adjacent the lower end of a central passage or chamber which central passage or chamber is surrounded by an inner flow chamber which in turn is surrounded by an outer flow chamber, said flow chambers being in communication with one another at their upper ends and said outer flow chamber and said central passage being in communication at their lower ends whilst the inner flow chamber and said central passage communicate with one another below the level of the upper end of the inner flow chamber.

The said inner and outer flow chambers are preferably of annular form and said central passage is preferably of downwardly convergent conical form with the centrifugal impeller disposed in the space which connects the lower end of said central passage with the outer flow chamber.

The invention is further described by way of example with reference to the accompanying drawings, in which:

Fig. 1 is a part sectional side elevation,

Fig. 2 is a plan view, and

Fig. 3 is a sectional plan view on the line A—A of Fig. 1.

Referring especially to Fig. 1, a cylindrical tank 1 is mounted on a stand 2 of tubular construction and contains a concentric cylindrical partition 3 spaced from the cylindrical wall of the tank to define an outer flow chamber 4. The upper end of said cylindrical partition 3 lies below the level of the top of the tank and the lower end of the said cylindrical partition 3 is located above the bottom of the tank and merges into or is connected with an inwardly extending lower partition 5 which in turn merges into or is connected with an upwardly extending central passage element 6 which, with the partition 3 defines an inner flow chamber 7 surrounding the central passage element 6. The central passage element 6 rises to a level above the top of the tank and is of downwardly convergent conical form. Openings 8 are formed in the central passage element 6 below the level of the upper end of said cylindrical partition 3 to enable liquid to flow from the inner flow chamber 7 into the central passage formed by the element 6.

The bottom of the tank and the partition 5 define a connecting space through which liquid can flow from the central passage to the outer flow chamber 4.

An impeller shaft 9 passes centrally through the central passage element 6 and is journalled in upper and lower bearing assemblies 10, 11 secured respectively to the tubular frame 2 and to the bottom of the tank. The impeller shaft 9 is driven by an electric motor 12 through belts 13 and belt pulleys 14, 15.

The impeller consists of a set of outwardly extending curved blades 16 (Fig. 3.) secured between lower and upper cover plates 17, 18 (Fig. 1) of which the lower cover plate 17 is secured by screws 19 to a boss 20 which is welded to the shaft 9.

The impeller is of the type which is fed more or less axially at its centre and discharges more or less radially at its periphery and the upper cover plate 18 has a central opening which permits ingress of liquid into the impeller.

A set of stationary vanes or baffles 21 (Figs. 1 and 3) extend away from the periphery of the impeller through the said connecting space leading from the impeller to the outer flow chamber 4. The purpose of these vanes 21 is to prevent undue rotational movement of the liquid after leaving the impeller. The tank is provided with a drainage outlet 22 in its bottom and a small hole is provided in the outer part of the partition 5 to enable liquid in the lower part of the inner flow chamber to drain therefrom.

A downwardly directed chute 23 enters the central passage element 6 at a level near the upper end of the inner flow chamber.

A tubular coil 24 is arranged in the outer flow chamber 4 and its ends 25, 26 can be connected with a source of heating medium or with a source of cooling medium or they can be alternatively connected with one or the other to control the temperature of the liquid.

The said coil 24 is supported in the outer flow chamber 4 by rising baffle elements 27 in the form of flat plates which extend across the outer flow chamber and thereby serve to restrain rotational movement of the liquid whilst flowing through the outer flow chamber 4. These baffle elements 27 are preferably vertically disposed and four in number, each opposite pair lying more or less in line with one another and at right angles to the other pair.

The tank 1 may be provided with a lid or cover in which case it is advisable that the cover should have a suitable vent.

The invention is particularly suitable for the preparation of urea formaldehyde condensation products. For this purpose a quantity of formaldehyde solution (formalin) is fed into the tank and the impeller is caused to rotate to cause the liquid to move outwardly from the impeller, through the guide vanes 21, then to ascend through the outer flow chamber 4 and to pass therefrom over the upper edge of the cylindrical partition 3 (serving as a weir) into the inner flow chamber 7 where it flows downwardly towards the openings 8 of the central passage element 6 where it again flows inwardly and downwardly and then through the central opening in the cover plate 18 of the impeller whereupon it is re-centrifuged and caused to flow repeatedly through the closed circuit described above.

When the formalin is thus circulating the urea is fed through the chute 23 into said central passage element and together with the formalin is passed by the impeller outwardly from the lower end of the passage element.

In the preparation of urea formaldehyde condensation products the impeller may be rotated at about 300 revolutions per minute.

The mixing of the urea with the formaldehyde solution gives rise to an endothermic reaction which reduces the temperature of the mix to about 0° C. An ammonia solution is then added to the mix giving rise to a mild exothermic reaction. Steam may be passed through the coil 24 to raise the temperature of the mix to say 30° C. whereafter the temperature may be maintained substantially constant by passing either steam through said coil to heat it or water in order to cool it.

An alternative use for the apparatus of the present invention may be for the dissolving of caustic soda in butanol to produce an alkaline reagent, the tank being first charged with butanol, and caustic soda being fed through the chute 23 when the butanol is in circulation as described above with reference to formalin.

In certain applications of the invention to the dissolving of a solid in a liquid it may be an advantage to provide a sieve or filter immediately surrounding the impeller. In this way fragments of soluble solid matter can be held back at the periphery of the impeller where they can be subjected to the dissolving action of the liquid moving at relatively high speed under the centrifugal action of the impeller. The grid or mesh can be stationary but is preferably secured to the periphery of the impeller so as to rotate therewith. The size of the mesh should be chosen in relation to the nature of and size of the fragments of solid matter to be dissolved with a view to achieving a maximum tendency for the solid matter to become dissolved without undue risk of completely blocking up the mesh.

The apparatus of the present invention may also be used for the liquid treatment of certain manufactured goods e. g. socks, which may be held in a cage or basket of annular form located in the outer flow chamber 4 or in the inner flow chamber 7. Such a cage or basket should have a perforate top and bottom to permit passage of the washing or other liquid therethrough.

I claim:

1. An apparatus for treating one substance with another of which at least one is a liquid comprising a cylindrical tank, a central passage element rising from a level above the bottom of the tank to a level above the top of the tank, a cylindrical partition within the tank surrounding said central passage element with its upper end below the top of the tank and below the top of the central passage element and its lower end above the bottom of the tank to define an outer flow chamber between itself and the cylindrical wall of the tank and to define an inner flow chamber between itself and said central passage element, a lower partition extending from the lower end of said cylindrical partition to the lower end of said central passage element to define between itself and the bottom of the tank a connecting space between the central passage element and the outer flow chamber, and an impeller located in said connecting space immediately beneath the central passage element, said central passage element having at least one opening therein below the mid-height of said cylindrical partition at a level above the impeller to connect the central passage element with the inner flow chamber.

2. Apparatus acording to claim 1 including a driving shaft for said impeller extending upwardly through said central passage element and lower bearing means for said shaft within the tank and upper bearing means for said shaft located above the top of the tank.

3. Apparatus according to claim 1 including a tubular coil in the outer flow chamber for controlling the temperature of the liquid.

4. Apparatus according to claim 1 including rising baffle elements extending across the width of the outer flow chamber to restrain rotational movement of the liquid whilst flowing through said outer flow chamber.

5. An apparatus for treating one substance with another of which at least one is a liquid comprising a cylindrical tank, a central passage element rising from a level above the bottom of the tank to a level above the top of the tank, a cylindrical partition within the tank surrounding said central passage element with its upper end below the top of the tank and its lower end above the bottom of the tank to define an outer flow chamber between itself and the cylindrical wall of the tank and to define an inner flow chamber between itself and said central passage element, a lower partition extending from the lower end of said cylindrical partition to the lower end of said central passage element to define between itself and the bottom of the tank a connecting space between the central passage element and the outer flow chamber, said central passage element having at least one opening therein below the mid-height of said cylindrical partition to connect the central passage element with the inner flow chamber, an impeller located in said connecting space immediately beneath the central passage element, said impeller being of the kind which is fed substantially axially at its centre and discharges substantially radially at its periphery and comprising an upper cover plate and a lower cover plate and a plurality of downwardly extending curved blades secured between said cover plates of which the upper has a central opening therein to permit ingress of liquid into the impeller, a set of stationary vanes extending away from the periphery of the impeller through said connecting space towards the outer flow chamber for the purpose of preventing undue rotational movement of the liquid after leaving the impeller, rising baffle elements extending across the width of said outer flow chamber to restrain rotational movement of the liquid whilst flowing through said outer flow chamber and a tubular coil supported by said baffle elements.

6. An apparatus according to claim 5 and including a grid surrounding and mounted on the impeller so as to rotate therewith for the purpose of holding back fragments of soluble solid matter at the periphery of the impeller.

References Cited in the file of this patent

UNITED STATES PATENTS

| 611,432 | Katzenstein | Sept. 27, 1898 |
| 1,211,828 | Dorr | Jan. 9, 1917 |
| 1,309,219 | Ruth | July 8, 1919 |
| 1,678,787 | Remick | July 31, 1928 |
| 1,734,747 | Seeley | Nov. 5, 1929 |
| 1,953,022 | McCombs | Mar. 27, 1934 |
| 2,031,788 | Persoons | Feb. 25, 1936 |
| 2,085,492 | Ellis | June 29, 1937 |
| 2,430,180 | LeGloahec | Nov. 4, 1947 |
| 2,458,261 | Green et al. | Jan. 4, 1949 |
| 2,467,212 | Kvalnes | Apr. 12, 1949 |
| 2,617,334 | Kolb et al. | Nov. 11, 1952 |

FOREIGN PATENTS

| 550,990 | Germany | May 24, 1932 |
| 609,091 | Great Britain | Sept. 24, 1948 |
| 788 | Switzerland | Apr. 24, 1889 |